Jan. 13, 1959     O. E. DE LANGE     2,868,965
PULSE MODULATION REGENERATIVE REPEATERS
Filed Dec. 11, 1953     4 Sheets-Sheet 1

INVENTOR
O. E. DE LANGE
BY
H. O. Wright
ATTORNEY

Jan. 13, 1959     O. E. DE LANGE     2,868,965
PULSE MODULATION REGENERATIVE REPEATERS
Filed Dec. 11, 1953                                   4 Sheets-Sheet 2

INVENTOR
O. E. DE LANGE
BY
H. O. Wright
ATTORNEY

Jan. 13, 1959  O. E. DE LANGE  2,868,965
PULSE MODULATION REGENERATIVE REPEATERS
Filed Dec. 11, 1953  4 Sheets-Sheet 3

INVENTOR
O. E. DE LANGE
BY
H. O. Wright
ATTORNEY

Jan. 13, 1959     O. E. DE LANGE     2,868,965
PULSE MODULATION REGENERATIVE REPEATERS
Filed Dec. 11, 1953     4 Sheets-Sheet 4

FIG. 7

INVENTOR
O. E. DE LANGE
BY
*H. O. Wright*
ATTORNEY

United States Patent Office 2,868,965
Patented Jan. 13, 1959

2,868,965

PULSE MODULATION REGENERATIVE REPEATERS

Owen E. De Lange, Rumson, N. J., assignor to Bell Telephone Laboratories, Incorporated, New York, N. Y., a corporation of New York Application December 11, 1953, Serial No. 397,553

3 Claims. (Cl. 250—15)

This invention relates to regenerative repeaters for microwave pulse modulation systems in which the signal is transmitted in the form of a series of microwave pulses which are normally recurrent at various subharmonic frequencies of a predetermined nominal pulse repetition frequency and occasionally recurrent at said nominal pulse repetition frequency. More particularly, it relates to microwave pulse regenerating circuits and timing wave generators adapted for use in such repeaters.

Particular features of the invention relate to improved apparatus for regenerating pulses of the above described character and for controlling the regeneration of said pulses in the presence of substantial "noise" or other interfering electrical pulses. Also to be considered are systems in which the incoming pulse series may have substantial intervals during which no pulses occur or intervals during which interfering or overlapping of pulses may be encountered.

A principal object of the invention is, accordingly, to provide new and improved apparatus for regenerating microwave signal pulses in microwave pulse modulation systems.

Another object of the invention is to provide improved apparatus for timing the regeneration of microwave signal pulses in microwave pulse modulation systems.

A further object is to provide a simple and cheap regenerative repeater for microwave pulse modulation systems.

Other and further objects and features of the invention will become apparent during the course of the following detailed description of illustrative circuit arrangements which can be employed in carrying out the purposes of the invention, and from the appended claims.

In general, the repeater stations including the pulse regenerating circuits of the invention, after receiving and amplifying a signal pulse, proceed to regenerate the pulse in the following manner. The energy of the pulse is divided equally between two similar transmission paths, each path including an arrangement which can limit the amount of energy transmitted by the path provided the energy exceeds a particular predetermined amplitude which amplitude may be different for the two paths. The two portions of the energy are subsequently recombined after passing along the paths and differences between the two portions are utilized to provide a regenerated pulse. To afford controllable differences between the transmission characteristics of the two similar transmission paths a diode (or uni-directionally conductive element) is associated (usually in shunt relation) with each, the diodes for the two paths being selected to have substantially identical electrical characteristics. A back-bias voltage source is then connected to each diode and adjusted so that the diode becomes conductive at a predetermined amplitude of the energy being transmitted through the path with which the diode is associated.

In a first arrangement, the diode in one path is back-biased so as to become conductive for a major portion of each pulse (i. e., it is usually back-biased to become conductive at about half the normal amplitude of the signal pulses) and the other diode is back-biased so as to become conductive for a minor portion only (the latter portion being at and near maximum pulse amplitude). For amplitudes in either arm exceeding that necessary to render the diode associated with that arm conductive the diode circuit absorbs sufficient energy so that the output of its associated arm becomes substantially constant at the value at which conduction is initiated.

Three conditions of the over-all regenerating circuit are then to be considered. In a first condition, where no energy above the amplitude at which the first diode becomes conductive is present, the over-all circuit is electrically balanced so that the energy reaching a predeterminde output terminal of the circuit is substantially zero. In a second condition, where the pulse energy has exceeded the amplitude at which the first diode has become conductive but has not yet reached the point at which the second diode has become conductive, the over-all circuit is electrically unbalanced and has an output which increases rapidly as the pulse amplitude increases. Finally, in a third condition, where the pulse energy has exceeded the amplitude at which the second diode has also become conductive, the over-all circuit will be electrically unbalanced to a substantially constant degree determined by the difference between the respective back-bias voltages applied to the diodes and the output of the over-all circuit will have reached a maximum and substantially constant value. In the terminology employed by those skilled in the art, for the first condition the over-all regenerator circuit is in an electrically "balanced," substantially zero output, condition (i. e., the circuit operates as a "limiter" in the sense that all signals below the amplitude at which the first diode becomes conductive produce no output), for the second condition the over-all circuit operates as an "expander," and for the third condition the over-all circuit operates as a "limiter." The over-all operation of the circuit is described as "slicing" and "limiting" and the general effect desired and produced is to convert a rounded (distorted) pulse into a sharper pulse of definite amplitude.

In a pulse modulation system which is substantially free from interference, distortion, or cross-talk, any of which may introduce spurious or unwanted pulses, and in which the inter-pulse spaces are large compared with the normal pulse width so that adjacent pulses have no tendency to merge with each other, the above-described first arrangement of the over-all pulse regenerating circuit may prove satisfactory to regenerate the pulses as received at the repeater station. Very often, however, interference with other electrical systems, discharges of static electricity, and the like may introduce spurious or unwanted energy pulses into the transmission media of the system and, where closely spaced pulses are employed, a number of pulses may, because of distortion, tend to merge into a single broad pulse. It is usually desirable, therefore, not only to regenerate the wanted pulses of the system but also to eliminate, insofar as may be practicable, the spurious or unwanted pulses, and the possible merging of the wanted pulses, received at the repeater or terminal stations.

Since in systems of the type contemplated in connection with the present invention, the wanted pulses are assumed to have a "nominal" pulse repetition frequency, (i. e., all wanted pulses, if and when present, will occur only at substantially such instants as are included within a sequence of regularly spaced and recurrent instants, defined, for example, as the instants of maximum positive amplitude of a timing sine wave of the given or "nominal" frequency) the majority of spurious unwanted pulses can be completely eliminated and the tendency of closely spaced pulses to merge can be overcome, by the simple expedient of "gating," in one way or another, the pulse regenerator circuit to pass only received pulses arriving at instants conforming to the appropriate instants corresponding to the "nominal" pulse repetition frequency of the system. Spurious or unwanted pulses occurring simultaneously with wanted signal pulses will in effect be eliminated by the action of the pulse regenerator. Accordingly, except for an occasional unwanted pulse occurring at a nominal pulse-repetition instant during which no wanted pulse is also present, the effect of spurious or unwanted pulses is completely eliminated.

Therefore in a second arrangement of the invention, the diodes in both arms of the above-described pulse regenerating circuit are given equal back-bias by their respective voltage sources so that the circuit is normally "balanced" for all values of received pulse amplitude and has, therefore, a substantially zero output. A source of gating pulses of the nominal pulse repetition frequency is then employed to effect an appropriate unbalance during each gating pulse by altering the effective value of one or both of the back-biases on the diodes of the pulse regenerator circuit at instants consonant with the nominal pulse repetition frequency of the system. Thus wanted pulses are regenerated and passed by the pulse regenerating circuit in the same manner as described above for the arrangement employing fixed different diode back-biases. Unwanted or spurious pulses occurring at instants not consonant with the nominal pulse repetition frequency find the pulse regenerating circuit in a balanced condition and are not passed to the output of the regenerator. The instrumentality by which appropriate gating pulses are provided to the pulse regenerator circuit is referred to, by those skilled in the art and in this application, as a timing wave generator. It is preferably maintained in synchronism with the wanted pulses of the system by "locking" it in with the wanted pulses currently being received. This involves, as will be explained in detail below, adjusting the phase of the gating pulses until they are in synchronism with the wanted pulses currently being impressed upon the input of the pulse regenerating circuit. The line-up or adjustment of such circuits of the pulse modulation system is preferably effected while an appropriate known series of test signal pulses is being transmitted through the system. Where gating pulses are applied to only one diode, the fixed biases are usually set at approximately the normal half-amplitude of the signal pulses. Where gating pulses are applied to both diodes the fixed biases are usually set at about the normal three-quarters amplitude of the signal pulses so that equal amplitude pulses of opposite polarity will raise the effective back-bias of one diode to full amplitude while lowering that of the other to half amplitude.

The nature and principles of the invention can be more readily perceived from the following illustrative preferred embodiments of arrangements of the invention, as shown in the accompanying drawings, in which.

Figure 1:
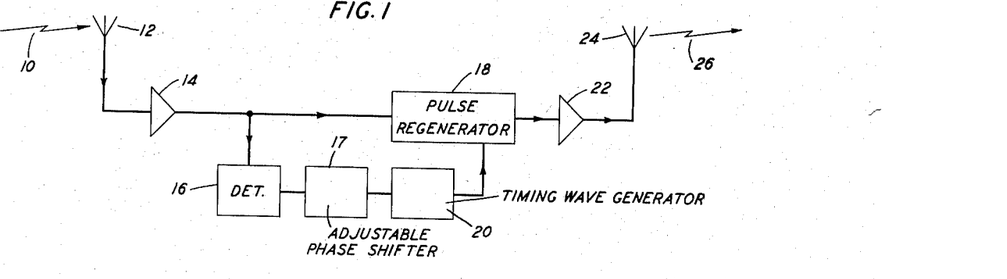
Fig. 1 is a block schematic diagram of a regenerative repeater for pulse modulation systems, in which various circuit arrangements of the invention can be incorporated.

In more detail, in Fig. 1 incoming pulses 10 of microwave frequency radio wave energy are received on antenna 12 and passed through an amplifier 14. A small portion of the output energy of amplifier 14 is detected in detector 16 and furnished, via adjustable phase shifter 17, to timing wave generator 20, preferred characteristics and a specific preferred form of which will be discussed in detail hereinbelow in connection with Figs. 7 and 8. The major portion of the output energy of amplifier 14 is transmitted directly to pulse regenerator 18 where, under control of pulses from timing wave generator 20, the received pulses are regenerated in both amplitude and timing to remove the effects of noise and distortion. The regenerated pulses are transmitted to amplifier 22 and the amplified regenerated pulses are transmitted to antenna 24 whence they are radiated, as radio energy pulses 26, to the next successive station of the pulse modulation system. A number of preferred forms for pulse regenerator 18 will be described in detail below, particularly in connection with Figs. 2 through 6, inclusive. For reasons which will become apparent hereinafter, the adjustable phase shifter 17 is adjusted so that the timing pulses furnished by generator 20 are brought into substantial phase-coincidence with the signal pulses to be regenerated in pulse regenerator 18.

Figure 2:
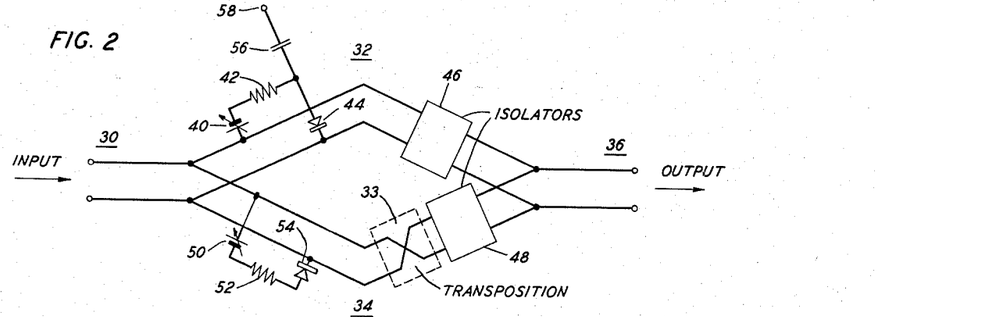
Fig. 2 is a two-conductor schematic circuit diagram employed in illustrating the basic principles of pulse regeneration involved in arrangements of the invention.

In Fig. 2, a two-conductor pulse regenerator circuit of the invention is shown interconnecting an input two-conductor transmission line section 30 and an output two-conductor transmission line section 36. The pulse regenerator circuit per se comprises two arms 32 and 34 which are carefully constructed to be electrically identical in all respects except that arm 34 includes a phase reversal of 180 degrees obtained by transposing the two conductors of that arm as shown at 33 in Fig. 2.

Included in shunt, across arms 32 and 34 are back-biased diodes 44 and 54, respectively. Potential source 40 and resistor 42 comprise the back-biasing circuit for diode 44, and potential source 50 and resistor 52 comprise the back-biasing circuit for diode 54. The back-bias on each diode determines, as its designation implies, the voltage above which the input signal must be raised to render the diode conductive. Diodes 44 and 54 may, for use at relatively low frequencies, be of the well known vacuum tube type, but for very high frequency, i. e., microwave, use are preferably of the also well known crystal rectifier type. Crystals of silicon, galena, germanium or various other mineral crystals can, as is well known to those skilled in the art, be employed as diode rectifiers. Whatever form of diode is employed, the two diodes 44 and 54 should be carefully matched to be substantially identical electrically.

Isolators 46 and 48 of Fig. 2 are devices which, for example, freely pass energy from left to right but effectively prevent the passage of energy in the opposite direction. For a two-conductor circuit, isolators 46 and 48 can be, for example, simple vacuum tube amplifiers, otherwise well known to those skilled in the art as "buffer" amplifiers. In most instances, the over-all circuit of Fig. 2 will operate satisfactorily without isolators 46 and 48 and they can, in such instances, be omitted entirely. When used, they are employed for the purpose of preventing the reflection of energy from the output back to the input. At microwave frequencies "isolation" can be achieved by a number of arrangements, a typical example of which is described in detail in the copending application of L. C. Tillotson, Serial No. 389,137, filed October 29, 1953 and assigned to applicant's assignee.

Also connecting to diode 44 is a capacitor 56 having a free terminal 58 to which, for the purpose of "gating" the operation of the over-all circuit, a source of control or gating pulses can be connected, as well be explained in more detail hereinunder.

A first mode of operation of the circuit of Fig. 2 will be explained in connection with the input level versus output level characteristics shown in Fig. 3.

Since the two branches 32 and 34 of Fig. 2 are identical, except for the transposition 33 of branch 34, they form a bridge circuit which is normally balanced and has no output so long as the amplitude of the input is below the amplitude at which either of the diodes 44 and 54 begins to conduct.

To illustrate the mode of operation of the circuit of Fig. 2, it will be assumed that the back-bias voltage of potential source 50 is adjusted so that diode 54 will begin to conduct at a voltage $V_1$ (Fig. 3) and that the back-bias voltage of potential source 40 is adjusted so that diode 44 will begin to conduct at a voltage $V_2$. As is well understood in the art, the value of resistances 42 and 52 is selected to substantially match the diode and line impedances with which they are associated.

Figure 3:
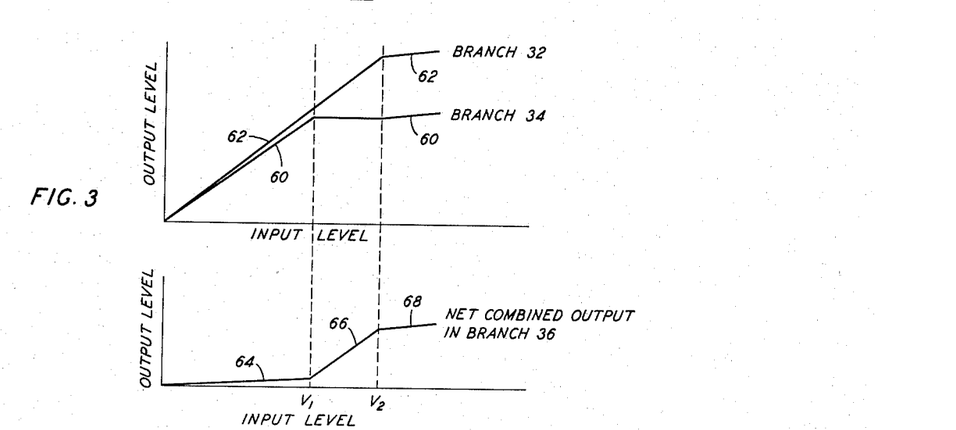
Fig. 3 comprises input level versus output level characteristics obtainable by a particular mode of operation of the circuits of the invention, as represented (inter alia) by the schematic circuit of Fig. 2.

The input level versus output level characteristics of the two branches 32 and 34 are then those illustrated by curves 62 and 60, respectively, of Fig. 3, the diode in each instance acting to absorb power from the circuit at all amplitude levels above that at which it begins to conduct and thus to limit the output of its branch to substantially the amplitude at which it begins to conduct.

The net combined output of the two branches 32 and 34 to the output section 36 is then, in view of the transposition at 33, the difference between their respective outputs and is illustrated by the bottom curve of Fig. 3 comprising three regions of amplitude, designated 64, 66 and 68, respectively, as shown. In region 64 both diodes are non-conducting and the over-all bridge circuit is substantially balanced so that the output is substantially zero. In region 66 diode 54 is conducting but diode 44 is still non-conducting so that the over-all bridge circuit is unbalanced and the output amplitude rises rapidly as the voltage is further increased. Throughout this second region, between voltage levels $V_1$ and $V_2$, the over-all circuit has, as noted above, a rapidly increasing amplitude characteristic and is, therefore, an "expander." However, at and above the amplitude of $V_2$ the second diode 44 also becomes conducting and the output of the over-all circuit is substantially fixed as illustrated by the region 68 of the bottom curve of Fig. 3. In this region 68 it is apparent that the circuit operates as a "limiter" and the over-all circuit is obviously an amplitude "slicing" circuit. Obviously, as the amplitude of the input energy pulse subsides from a maximum value, above the point at which diode 44 becomes conductive, through that point and then below the point at which diode 54 becomes conductive, the output of the pulse-regenerating circuit will rapidly decrease in amplitude between values $V_2$ and $V_1$ becoming zero at $V_1$. For operation, as described just above, condenser 56 is not used and, therefore, can, obviously, be omitted. The pulse regenerative circuit arrangement as above described and employing only fixed biases, obviously, will regenerate all pulses of at least sufficient amplitude to reach the region 66. No timing wave generator or other pulse selecting arrangement is necessarily involved in the operation of the regenerative circuit as just described.

In an alternative manner of operation for the over-all circuit of Fig. 2, in order to provide pulse selection and to thus eliminate spurious or unwanted pulses, and to prevent the merging of closely spaced wanted pulses, the back-biasing voltages of sources 40 and 50 are adjusted to be substantially identical and are preferably about one-half the normal maximum signal pulse amplitude. The value of bias is further such that when an additional pulse, commonly referred to as a gating pulse, is applied to one of the diodes, via terminal 58 and condenser 56 of Fig. 2, for example, biasing conditions substantially as illustrated at the top of Fig. 3 by curves 60 and 62 are established for the duration of each gating pulse only. Now if a signal pulse is applied simultaneously with a gating pulse and if its amplitude is sufficient to reach the region 66, it will be passed. Parts of such a pulse not coincident in time with the gating pulse or below region 66 in amplitude will not be passed. All parts having an amplitude greater than the upper limit $V_2$ of region 66 and which are coincident in time with the gating pulse, will be passed with the fixed amplitude established at the limiting voltage $V_2$, i. e., limited, as indicated by portion 68 of the trace of Fig. 3.

A possible third manner of operation, substantially equivalent to the manner just described, is to simultaneously apply gating pulses of opposite polarity to the two diodes, respectively, in which case gating pulses of lower (substantially one-half) amplitude can, obviously, be employed.

Figure 4:
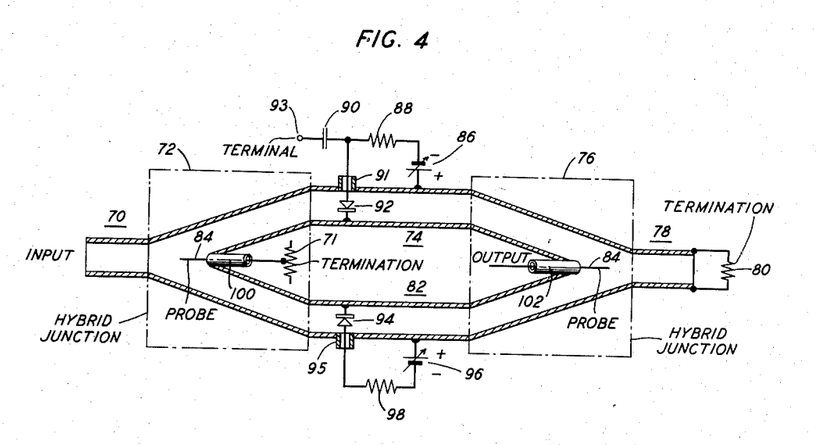
Fig. 4 is a microwave circuit of the general type illustrated in Fig. 2 but employing wave-guide components.

In Fig. 4, a very high, or microwave, frequency circuit consisting mainly of wave-guide components is shown which, at said very high frequencies, has substantially equivalent characteristics to those of the two-wire circuit of Fig. 2, as described above, for the appropriate lower frequency range of the latter circuit. In Fig. 4, arms 74 and 82 are like sections of wave guide having matched diodes 92 and 94 assembled therein at corresponding points of the wave-guide sections, respectively. Diodes 92 and 94 may take any of the forms described above for diodes 44 and 54 of Fig. 2, and, as for Fig. 2, they should be carefully selected to have substantially identical electrical properties over the frequency range to be employed.

One terminal of each diode is connected directly to the side of its enclosing section of wave guide, as shown. The other terminal of each diode is connected to a lead passing through an appropriate small opening in the enclosing section of wave guide, with which a radio frequency choke or by-pass 91 or 95, of conventional form, respectively, is associated. The leads just described connect to resistors 88 and 98, respectively, the resistors in turn being connected to the negative terminals of bias sources 86 and 96, respectively, the positive terminals of these bias sources being connected to the enclosing waveguide sections, all as shown in Fig. 4. A terminal 93 is coupled to the external lead from diode 92, through condenser 90 to provide for the application of gating pulses to diode 92, if desired.

Devices 72 and 76 are wave-guide hybrid junctions and can be, for example, of any of the types well known to those skilled in the art and designated variously as the "magic tee," the "rat-race," and the like. However, for the purposes of the present application, a mechanically somewhat more convenient, but electrically equivalent, design of wave-guide hybrid junction, shown and described in detail in United States Patent 2,575,804, granted November 20, 1951, to H. T. Friis, W. D. Lewis and L. C. Tillotson, assignors to applicant's assignee, is illustrated. A slightly modified form of the last-mentioned type of hybrid junction is also shown in the article entitled, "A Non-Reflecting Branching Filter for Microwaves," by W. D. Lewis and L. C. Tillotson, published at pages 83 through 95, in the Bell System Technical Journal, vol. 27, No. 1 for January 1948, see Fig. 6 on page 90 of said article.

As mentioned above, the circuit of Fig. 4 is substantially the microwave equivalent of the two-conductor low frequency circuit shown in Fig. 2 and described in detail above. Obvious differences are that the isolators 46 and 48 of Fig. 2 are omitted, the inherent properties of the output hybrid junction 76 of Fig. 4 being an acceptable substitute. Furthermore, the hybrid junctions 72, 76 of Fig. 4 are only approximated by the simple parallel connection of arms 32 and 34 to the end sections 30 and 36, respectively, of the circuit of Fig. 2. (As mentioned in connection with Fig. 2 the isolators 46 and 48 are not essential.) The hybrid junction 72 obviously effects the equal division of the energy of each input pulse into the two like transmission paths 74 and 82, respectively, and the hybrid junction 76 effects the recombination of the two energy components, a difference component appearing at its terminal 102, as is well understood by those skilled in the art. In the circuit of Fig. 4 an input section of wave guide 70 is connected to the common junction area or "throat" of the hybrid junction 72, as shown. Also, a section of wave guide 78 suitably terminated by an impedance matching resistive load 80, is connected to the common junction area or "throat" of the hybrid junction 76, the coaxial line arm 102 of junction 76, including probe 84, which can be simply an extension of the inner conductor of arm 102, serving as the output terminal at which energy appears when the balance of the over-all structure is disturbed by the operation of one or both of the diodes 92, 94. Terminal 100, including probe 84 of hybrid junction 72 is preferably also terminated by an impedance matching resistive termination 71 as shown. When diodes 92 and 94 are back-biased so as to operate when the voltages developed across them are $V_2$ and $V_1$, respectively, the individual outputs of arms 74 and 82, respectively, will be substantially as illustrated by curves 60 and 62 of Fig. 3, respectively, and the resulting output appearing at terminal 102 of hybrid junction 76 will be substantially as indicated by the lower curve 64, 66 and 68 of Fig. 3. The substantial equivalence of the arrangement of Fig. 4 at microwave frequencies to that of Fig. 2 at lower frequencies is thus apparent. A distinction in operation between the circuit arrangements of Figs. 2 and 4, which, however, does not affect the desired result, is that in Fig. 2 the "no output" condition is achieved by balancing the outputs of branches 32 and 34, with the result that when the structure of Fig. 2 is balanced the energy is reflected back to the input 30, whereas in Fig. 4 when the outputs of branches 74 and 82 are balanced, the combined power appears in output arm 78 and is completely absorbed by resistive termination 80.

The methods of operation as described above in detail for the arrangement of Fig. 2 are also, obviously, available in connection with that of Fig. 4. Namely, the diodes 92, 94 may be back-biased, by potential sources 86 and 96, respectively, to operate at voltages $V_1$ and $V_2$, respectively, as discussed above, or both diodes may have the same value of bias so that there will be no output for any normal input signal unless a gating pulse is simultaneously applied to terminal 91 and, finally, gating pulses of opposite polarity can be applied to both diodes (by adding a suitable coupling condenser and terminal for diode 94 and connecting an appropriate source of gating pulses to each diode). The resulting operations of the arrangement of Fig. 4 will be substantially as described in connection with that of Fig. 2 for the several methods of operation, respectively.

Figure 5:
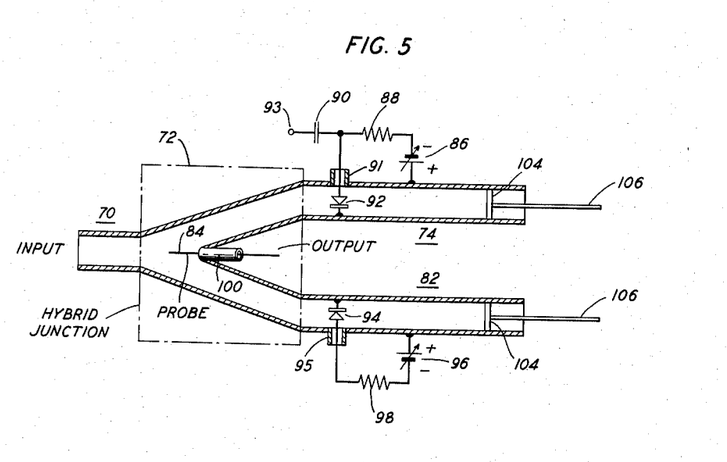
Fig. 5 is a modification of the circuit of Fig. 4.

In Fig. 5, a rearrangement and simplification of the structure of Fig. 4 is shown and involves omitting the second hybrid junction 76 of Fig. 4 and providing short-circuiting, sliding, plungers 104, 106, in the right ends of the wave-guide sections 74 and 82 as shown in Fig. 5. Plungers 104 are adjusted with both diodes 92 and 94 in an unoperated condition until the structure is balanced as evidenced by no output at arm 100 of hybrid junction 72 when energy is applied to input section 70. Similar elements of the arrangements of Figs. 4 and 5 are given like designation numbers, respectively. The arrangement of Fig. 5, when initially balanced as described above, will operate substantially in the identical manners described above for the arrangement of Fig. 4, the output appearing, of course, at terminal 100. In the arrangement of Fig. 5 the single hybrid junction 72 is, obviously, employed both to divide the input energy equally between the like transmission paths 74 and 82 and subsequently to recombine the output energy components in its output terminal 100.

It has been disclosed in the above-mentioned copending application of L. C. Tillotson, that a wave-guide structure substantially equivalent, electrically, to the combination of two hybrid junctions interconnected by two lengths of straight wave guide, as illustrated for example, by junctions 72 and 76 and wave-guide sections 74 and 82 of Fig. 4 of the present application, can be realized by inserting in the central portion of an elongated straight section of rectangular wave guide, a conductive partition which is parallel to the longitudinal axis and the broader sides of the wave-guide section and equidistant between the broader sides.

Figure 6:
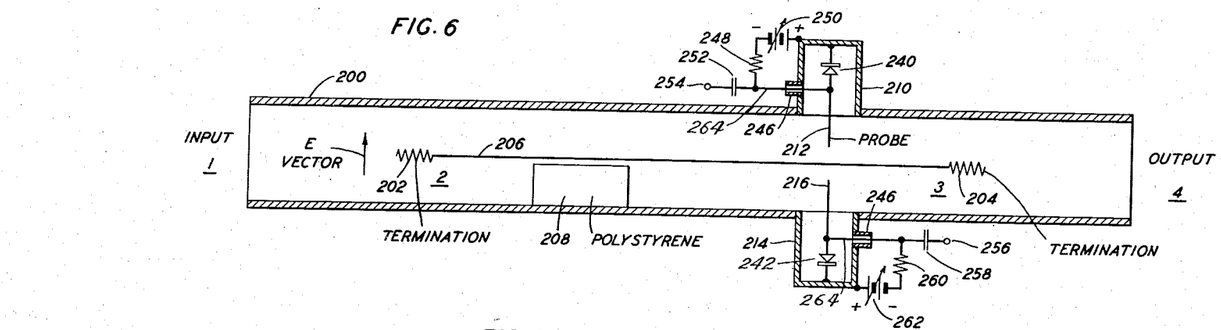
Fig. 6 illustrates a mechanically simplified microwave structure which functionally is substantially equivalent to the circuit arrangement of Fig. 4.

A structure of this type is illustrated in Fig. 6 where an elongated section of wave guide 200 has assembled therein, in the central portion thereof, a conductive partition 206, mid-way between and parallel to the broader sides of the wave-guide section, dividing the central portion thereof into two like parallel channels. These two channels can be considered as substantially equivalent, electrically, to the two wave-guide sections 74 and 82, respectively, of Fig. 4 described above. The left and right ends of wave guide 200 at the left and right ends of partition 206, respectively, can be considered as substantially equivalent electrically to the throat sections of hybrid junctions 72 and 74 of Fig. 4, respectively. Similarly, the left and right ends of partition 206 can be considered as substantially equivalent electrically to the terminals 100 and 102, respectively, of Fig. 4.

By placing matching resistive terminations 202 and 204 at the ends of partition 206, we are, therefore, in effect terminating the equivalent of terminals 100 and 102 of Fig. 4. Resistive terminations 202 and 204 are preferably relatively thin strips or cards of a dielectric material such as polystyrene which have been impregnated or coated with particles of a lossy material such as carbon. They should be situated immediately adjacent their respective ends of the partition 206 and in the same plane. Their respective resistances should match the impedance of the two parallel channels connected in series.

With only the structure as thus far described, energy introduced into either end of the main section of wave guide 200 will divide equally between the two channels formed by inserting partition 206, and the two equal portions of energy will recombine in phase at the far end of the two channels and pass out the other end of wave guide 200. This is the obvious and natural result of the fact that the resistive terminating strips 202 and 204 and partition 206 are, in the absence of any electrical unbalance resulting from the presence of disturbing elements, not coupled to the $TE_{10}$ mode waves normally employed with the rectangular wave guide 200.

However, when diode assemblies 210 and 214 are added, comprising probes 212, 216, diodes 240, 242, and their respective associated back-biasing circuits 264, 248, 250 and 264, 260 and 262, for the upper and lower of the two channels respectively as shown in Fig. 6, and the back-biasing voltages provided by voltage sources 250 and 262 are set at $V_2$ and $V_1$, respectively, we then have (neglecting for a moment the phase shifting element 208) a circuit arrangement substantially identical electrically to that of Fig. 4 and its characteristics will be substantially as illustrated by the curves of Fig. 3, where curve 62 will now represent the output of the upper channel and curve 60 the output of the lower channel in Fig. 6, and the lower curve 64, 66, 68 represents the "output" obtained as a result of combining the just-mentioned upper and lower channel outputs. By comparison of the over-all structures of Figs. 4 and 6, it is apparent that in the structure of Fig. 6 (still neglecting element 208) this combined "output" will appear at and be absorbed in termination 204.

While we could omit resistive termination 204 and substitute therefor an iris or loop coupling to an external transmission line through a side of the wave-guide section 200 immediately adjacent termination 204, as is illustrated and described in detail in the above-mentioned copending application of L. C. Tillotson, we can, for the purposes of the present invention, avoid the necessity of providing such an additional output transmission line by simply inserting in either of the two parallel channels a phase shifting member 208 proportioned to provide a phase shift of 180 degrees and the output illustrated by curve 64, 66, 68 of Fig. 3 will then appear at the right end of wave guide 200 and no additional external terminal structure will then be required. In the complete structure of Fig. 6 resistive termination 204 will correspond to and perform the function of termination 80 of the structure of Fig. 4.

The arrangement of the diode assemblies 210, 214 of Fig. 6 is somewhat altered from that of the corresponding diodes 92, 94 of Fig. 4, in that, in Fig. 6 only the probes protrude into the wave-guide channels, the diode elements 240, 242, per se, being in external housings, as shown, opening into their respective wave-guide channels. In each instance the positively biased terminal of the diode is connected to its housing as shown and the other terminal of the diode is connected by a lead 264 passing through the associated housing as shown. A radio frequency choke or by-pass member 246 of conventional form is provided on each lead 264 where it passes through the diode housing, as shown. Diode 240 is back-biased by voltage source 250 through resistor 248 and lead 264, as shown. Diode 242 is back-biased by voltage source 262 through resistor 260 and lead 264, as shown. The externally mounted diode assembly of the type illustrated in Fig. 6 has been found to operate somewhat better at lower microwave frequencies than the internally mounted type employed in Fig. 4. Over a considerable portion of the presently employed microwave frequency region the two types are substantially interchangeable but at the higher microwave frequencies the type illustrated in Fig. 4 has been found to be somewhat preferable.

The over-all structure of Fig. 6 is obviously in many respects simpler and more economical to construct than that of Fig. 4 and as explained above, is substantially equivalent thereto in its electrical properties.

The over-all arrangement of Fig. 6 can be operated in accordance with any of the methods described above for the electrically equivalent arrangements of Figs. 2, 4 and 5. In other words, as discussed above, one diode may be back-biased so as to become conductive at a first voltage $V_1$ and the other so as to become conductive at a second voltage $V_2$ in which case the over-all circuit will require no timing or gating pulses in order to operate as illustrated by the curves of Fig. 3. Alternatively, both diodes may be back-biased equally so that the circuit is balanced at all times except during the occurrence of a gating pulse applied to one or both diodes, through terminals 254, 256 and capacitors 252, 258, respectively, as discussed for the corresponding arrangements in Fig. 4, for example.

Considering again the over-all regenerative repeater illustrated by the block schematic diagram of Fig. 1, if the pulse repetition frequency were substantially always present at the output of detector 16 the timing wave generator 20 could consist only of a very narrow filter tuned to this frequency. Indeed, in the absence of interfering pulses and "noise," the timing wave generator 20 and associated detector 16 and phase shifter 17 could be omitted entirely and regenerator 18 could then be operated with different fixed biases and without control pulses, as described above in connection with the arrangements of the general type illustrated by Fig. 2.

In practice, however, there are often fairly long periods when the repetition frequency is entirely missing, since there are corresponding periods in which either no signal pulses are present or overlapping of pulses resulting from band width limitations, echoes, noise or other irregularities, effectively masks or obscures the wanted signal pulses. In the majority of practical cases, therefore, it is preferable to supply some type of well defined timing wave to regenerator 18. It is the purpose of generator 20 to supply such a suitable timing wave to regenerator 18. While a simple sine wave can be employed, appreciably better results can be obtained when a train of appropriately timed short "gating" pulses is provided. This pulse train should preferably include a pulse for every possible signal pulse. In other words, the frequency of occurrence of the timing pulses should coincide with the nominal pulse repetition frequency of the system.

The generation of a preferred type of timing wave pulse train will be discussed below, the steps being illustrated by the series of characteristics shown at lines A through G, inclusive, in Fig. 7 of the accompanying drawings. The characteristics illustrated in Fig. 7 will be briefly discussed after which a preferred circuit, suitable to generate the preferred type of timing wave pulse train, as illustrated in Fig. 8, will be described.

Figure 7:
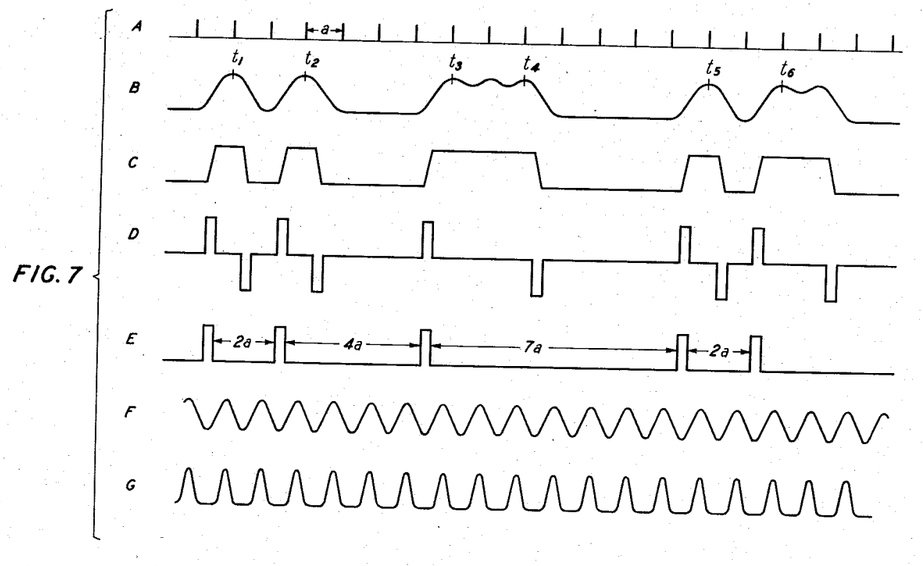
Fig. 7 illustrates in detail the preferred characteristics of the several stages of a timing wave generator circuit for use in systems of the invention.
Figure 8:
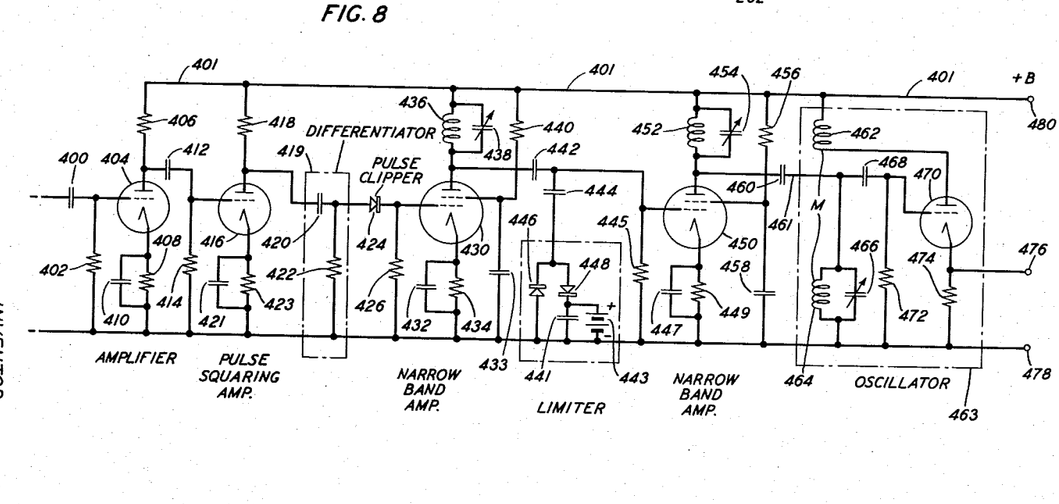
Fig. 8 is a schematic circuit of one suitable form of timing wave generator for systems of the invention.

In Fig. 7, line A, is shown a group of pulses occurring at the nominal pulse repetition frequency and separated by time intervals $a$. The nominal pulse repetition frequency, is therefore, $$f = \frac{1}{a}$$

In Fig. 7, line B, a typical group of pulses such as may appear in the normal operation of a pulse modulation system at the input to a pulse regenerative repeater are represented. For the time interval $t_1$ to $t_2$ there is no component of frequency $f$ present since one pulse is missing. However, there is present during this interval a frequency component of $f/2$. Similarly, from time $t_2$ to $t_3$ there is no component of frequency $f$ but there is a component of frequency $f/4$. From $t_3$ to $t_4$ there is a small component of frequency $f$ but from $t_3$ to $t_5$ there is a large component of frequency $f/7$. Since the intervals between consecutive pulses, as shown in line B, are all exact multiples of $a$, all frequencies involved must be exact submultiples of frequency $f$.

It is well known that if a voltage of frequency F is applied to certain non-linear devices, such as a vacuum tube operated over a non-linear portion of its characteristic, the output of the devices will contain components of frequencies NF, where N can take on a large number of integral values. If we apply to this device a train of pulses such as that shown at line B in which there are also present frequency components of the form $f/N$, then the output will always contain the component $$\frac{N(F)}{N} = f$$

If the output of the device is passed through a sharp filter tuned to the frequency $f$, this frequency will be passed while all of the other frequencies present will be excluded. We thus have a device which constantly provides an output at frequency $f$ although its input is neither $f$ nor any fixed submultiple of $f$. Since the pulses shown at line B are "phase locked" with the nominal pulse repetition frequency, the output of the non-linear device will also be "locked in" with the phase of this voltage.

One suitable method of operation is illustrated by the representations given in lines C to F, inclusive, of Fig. 7. Here the pulses of line B are "squared up" by means of an overloaded pulse amplifier, as indicated in line C. These pulses when differentiated produce the series of short positive and negative pulses (or pips) of line D. Removing the negative pulses by any of a number of well known methods there is left the group of positive pulses shown at line E. At any instant the actual pulse repetition frequency is seen to be an exact submultiple of the nominal pulse repetition frequency $f$, i. e., $$F_{rep.} = \frac{f}{N}$$

It is well known that short pulses such as those shown at line E contain frequencies which are multiples and even very high multiples of the repetition frequency. Then $$\frac{N(f)}{N} = f$$

must be present for a large range of values of N. As N changes, the amplitude of the component at frequency $f$ will also change. These amplitude changes can be smoothed out, in accordance with conventional practice, by means of amplitude limiters and amplifiers. A continuous sine wave of substantially uniform amplitude can thus be generated from the incoming pulses as illustrated at line F.

It would, of course, be possible to generate the sine wave mentioned above and to derive gating pulses from it without the use of an oscillator such as that represented by vacuum tube 470 and its associated circuits in Fig. 8. However, if the gaps between pulses became very long, i. e., if N became very large, the circuits necessary to select the frequency $f$ to the exclusion of all other frequencies would need to be extremely sharp. Also, to minimize the effects of noise the circuits would need to be very sharp. This would require resonant circuits having an extremely high electrical efficiency, or "Q," which are not too readily realized as a practical matter. A "locked in" oscillator is, on the other hand, a simple means of obtaining a device having effectively a very sharp frequency characteristic. Also, under certain conditions, it might be desirable to obtain timing information from the output of the regenerator rather than from its input. In the illustrative circuit schematic of Fig. 1, this would, obviously, correspond to connecting the input of detector 16 to the output (right end) of regenerator 18 rather than to the input of regenerator 18 as actually shown. Under these conditions the use of an oscillator in the timing wave generator would make the system "self-starting."

In Fig. 8 a somewhat simplified circuit for realizing the characteristics illustrated by Fig. 7, lines C through G, is shown.

The input voltage to the grid circuit of triode vacuum tube 404, via coupling capacitor 400, is assumed to be as illustrated by line B of Fig. 7. Triode vacuum tube 404 and its associated circuit elements comprising resistors 402, 408, 406, and capacitors 400 and 410, constitute a conventional amplifying stage. At the grid of the second tube 416 an amplified and inverted replica of the voltage as illustrated by line B is therefore obtained, capacitor 412 and resistor 414 serving to couple the output (anode) circuit of tube 404 to the input (grid) circuit of tube 416. Capacitor 412 of course isolates the grid circuit of tube 416 from the D. C. source supplying the appropriate bias to the anode of tube 404. The positive terminal of such a suitable D. C. voltage source (not shown) is connected to terminal 480 of the circuit of Fig. 8, its negative terminal being grounded.

Triode vacuum tube 416 and its associated circuit elements comprising resistors 414, 418, 423 and by-pass capacitor 421, constitute a conventional limiting, or pulse-squaring, "overloaded" amplifying stage. In the anode circuit of tube 416 a voltage as illustrated by line C of Fig. 7 is therefore obtained. The combination of capacitor 420 and resistor 422 acts to differentiate this wave so that the voltage obtained across resistor 422 will be as illustrated by line D of Fig. 7. Diode 424 serves as a clipper to eliminate the negative pulses so that the voltage at the control grid of vacuum tube 430 is as illustrated by line E of Fig. 7.

Tetrode vacuum tube 430 and its associated circuit elements comprising resistors 426, 434, 440, capacitors 432, 433, 438 and inductor 436 constitute a conventional narrow band amplifier stage. The circuit comprising inductor 436 and capacitor 438 is tuned to be resonant at the nominal pulse repetition frequency $f$.

Coupling capacitor 442 isolates the grid circuit of tube 450 from the D. C. anode voltage supply.

The diodes 446 and 448 with their bias 443 and by-pass capacitor 441, constitute a limiter of a type well known to those skilled in the art. Without the limiter the voltage at the anode of vacuum tube 430 would be a sine wave of frequency $f$ but would vary substantially in amplitude with time. The limiter tends to reduce such amplitude variations.

Vacuum tube 450 and its associated circuit elements comprising resistors 445, 449, 456, capacitors 447, 454, 458 and inductor 452, constitute a second narrow band amplifier stage. The circuit comprising inductor 452 and capacitor 454 is also tuned to the frequency $f$.

The final stage including vacuum tube 470 with its associated inductors 462, 464, capacitors 466, 468, and resistors 472, 474, constitutes an oscillator of a well known type in which energy is coupled inductively, through mutual inductance M between inductors 462 and 464, from the anode back to the control grid. (Since the circuits comprising inductor 452 and capacitor 454 and inductor 464 and capacitor 466 are effectively in parallel, they could be combined into a single circuit.)

A pulsed output, as illustrated by line G of Fig. 7, will be obtained from the cathode circuit of tube 470, i. e., from across cathode resistor 474 at terminals 476 and 478, since tube 470 when oscillating strongly draws space current only in pulses. As described in connection with the circuit of Fig. 1 the phase of the timing wave pulses is adjusted by a phase shifter such as unit 17 of Fig. 1 so that a pulse of the timing wave G of Fig. 8, for example, is substantially coincident with a pulse of the input wave B of Fig. 8. Thus for each wanted pulse of the input wave B there will be a pulse of wave G coincident in time therewith since the pulse repetition rates of the pulses of wave B are all subharmonically related to the frequency $f$ of wave G. Since the received pulses $t_1$ through $t_6$ of the wave B are normally appreciably broader than the pulses of wave G the phase adjustment is obviously not too critical and considerable variation in the phase and shape of the received pulses will result in no substantial change in the shape of the outgoing or regenerated pulses. The timing of the latter is, obviously, rigorously maintained by the gating effect of the pulses of wave G of Fig. 7.

The advantage of the above-described apparatus and method over conventional arrangements can be seen by considering the oscillator input to be that illustrated at line E of Fig. 7 for the conventional case and that illustrated at line F of Fig. 7 for the case at hand. With an input such as that illustrated by line E of Fig. 7, it is fairly easy to synchronize an oscillator when the "frequency ratio," i. e., the ratio of the nominal repetition frequency to the sub-harmonic frequency of the pulses being instantly received, is relatively low, for example, is less than 10. On the other hand, when this ratio is relatively large, for example, as great as 50, synchronization by an input as illustrated by line E becomes very difficult. By converting the input voltage from the form illustrated by line E to that illustrated by line F, it has been found entirely practicable to synchronize with "frequency ratios" as great as 400 or more, and there is a probability that it could be successfully accomplished at considerably higher "frequency ratios." The advantage of the above-described circuit arrangement becomes even more outstanding if the voltage wave as illustrated by line F of Fig. 7 is compared with a train of pulses similar to that illustrated by line B of Fig. 7 but with much longer gaps between successive pulses.

The circuit of Fig. 8, described in detail immediately above, represents a preferred form of timing wave generator for use as unit 20 of Fig. 1 of the accompanying drawings.

Numerous and varied other arrangements within the spirit and scope of the principles of the invention can readily be devised by those skilled in the art, the above-described specific structures being illustrative only of a few typical applications of the principles involved.

What is claimed is:

1. A pulse regenerating circuit for regenerating the pulses of a pulse modulation system, said circuit including in combination, means for receiving the pulses of said modulation system, two similar transmission paths, means for dividing the energy of said received pulses into two substantially equal portions and directing said energy portions into said two similar transmission paths, respectively, each of said transmission paths including in coupled relation to said path a diode means, the diode means of said two transmission paths being substantially identical with respect to their electrical characteristics, back-biasing means connected to each of said diode means said back-biasing means being adjusted to render both diodes conductive at substantially the half amplitude and thus conductive over a predetermined major portion of each received pulse, additional pulsed biasing means connected to at least one of said diode means to render one of said diode means conductive over a substantially different portion of each received pulse than the other of said diode means during the occurrence of pulses of said additional biasing means, means for synchronizing the pulses of said last stated means with said received modulation system pulses and means for recombining said energies in opposition after passage through their respective transmission paths whereby a regenerated pulse representing the difference between said recombined energies is obtained at the output of said recombining means whenever a received modulation system pulse is substantially coincident in time with a pulse of said additional pulsed biasing means.

2. A pulse regenerating repeater circuit for a pulse modulation system employing a pulsed signal having a predetermined nominal pulse repetition frequency said circuit including a pulse regenerator circuit, a timing wave generator circuit providing a control timing wave to said regenerator circuit and means for deriving a replica of the incoming pulsed signal said means supplying said replica to said timing wave generator, said pulse regenerator circuit comprising an electrically balanced two branch circuit, each branch including a back-biased diode in shunt relation thereto, the control timing wave from said timing wave generator being connected to at least one of said diodes to periodically alter the relative effective back-biases of said diodes to a predetermined inequality, said incoming pulsed signal comprising pulses the intervals between successive pulses of which correspond at least to submultiples of said nominal pulse repetition frequency, said timing wave generator including in tandem relation, a pulse squaring amplifier, a differentiating circuit, a pulse clipper to eliminate pulses of one polarity, a first narrow band amplifier including an anode circiut tuned to said repetition frequency, a limiter circuit, a second narrow band amplifier including an anode circuit tuned to said repetition frequency and a pulsing oscillator locked in to said incoming signal pulses and normally oscillating at said repetition frequency whereby said pulsing oscillator provides said pulse regenerator circuit with control pulses having said repetition frequency, and means in said timing wave generator circuit to adjust the phase of said timing wave to bring particular pulses of said wave into substantial time coincidence at said pulse regenerator circuit with the pulses of said incoming pulsed signal.

3. The regenerating circuit of claim 8 in which the back-biasing means comprises a fixed back-bias voltage source connected to each diode means, said sources being of appreciably greater than zero voltage and substantially identical, and a pulsed bias source connected to at least one of said diode means for introducing during each pulse of said last-mentioned source a predetermined difference in the relative back-biases of said diode means, whereby pulses of said modulation system applied to said regenerating circuit in time coincidence with pulses of said pulsed back-biasing source are regenerated.

References Cited in the file of this patent

UNITED STATES PATENTS

| | | |
|---|---|---|
| 1,931,063 | Doba | Oct. 17, 1933 |
| 1,986,644 | Pfister | Jan. 1, 1935 |
| 2,032,117 | Corbett | Feb. 25, 1936 |
| 2,552,348 | Shapiro | May 8, 1951 |
| 2,617,930 | Cutler | Nov. 11, 1952 |
| 2,627,574 | Feldman | Feb. 3, 1953 |
| 2,652,541 | Cutler | Sept. 15, 1953 |